Sept. 25, 1923.
A. S. OUZOONIAN
1,468,830
SIGNAL FOR AUTOMOTIVE VEHICLES
Filed May 17, 1922    2 Sheets-Sheet 1
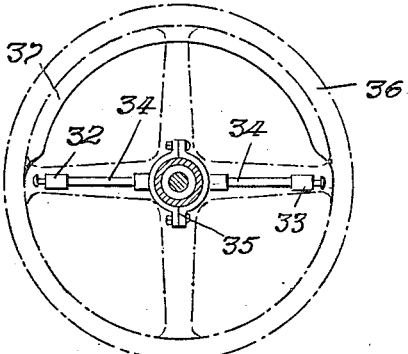
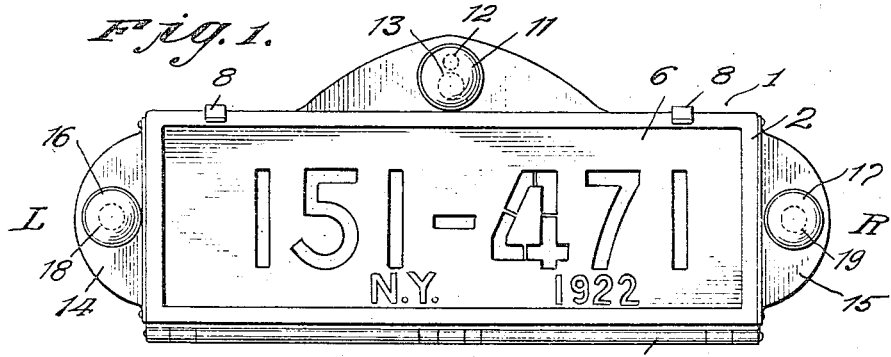
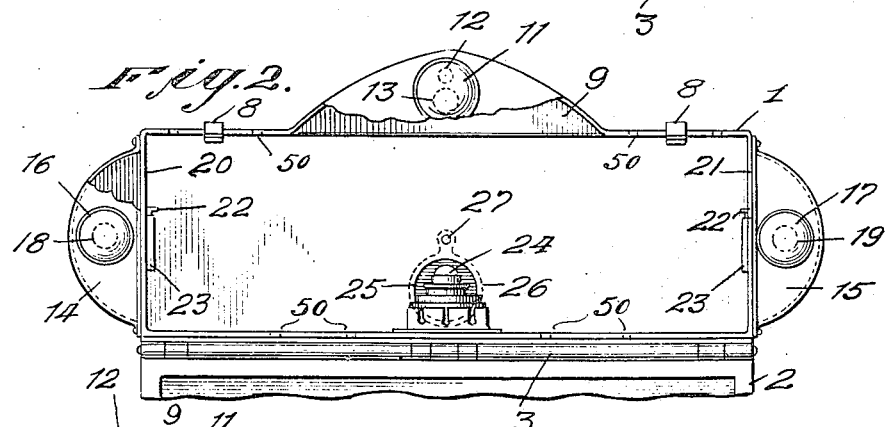
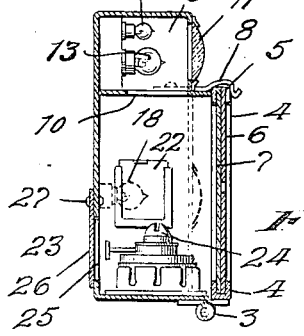
Inventor
Aram S. Ouzoonian
By his Attorneys Sept. 25, 1923.
A. S. OUZOONIAN
1,468,830
SIGNAL FOR AUTOMOTIVE VEHICLES
Filed May 17, 1922   2 Sheets-Sheet 2
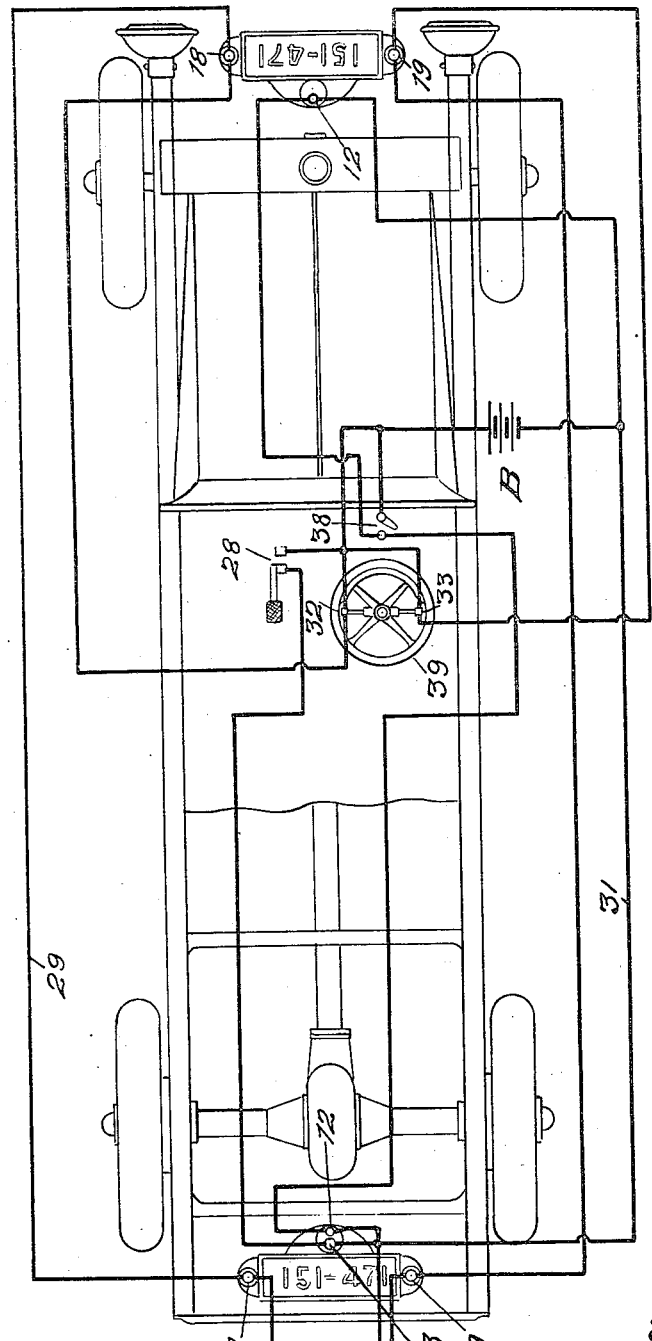

Patented Sept. 25, 1923.

1,468,830

UNITED STATES PATENT OFFICE.

ARAM SAMUEL OUZOONIAN, OF NEW YORK, N. Y., ASSIGNOR TO LITO-FONE COMPANY, INC., OF NEW YORK, N. Y., A CORPORATION OF NEW YORK.

SIGNAL FOR AUTOMOTIVE VEHICLES.

Application filed May 17, 1922. Serial No. 561,607.

*To all whom it may concern:*

Be it known that I, ARAM SAMUEL OUZOONIAN, a citizen of the United States, residing in the city of New York, borough of the Bronx, and State of New York, have invented certain new and useful Improvements in Signals for Automotive Vehicles, of which the following is a specification.

This invention relates to signals for automotive vehicles and is particularly concerned with a combined tail-light, direction indicator and device for holding and illuminating a license plate.

A good understanding of the invention may be had from the following description of a certain form of embodiment thereof, reference being had to the accompanying drawings, in which:

Figure 1 is a view showing one form of instrument embodying the invention in elevation;

Figure 2 is a view of the instrument of Figure 1 with the cover opened to show the interior construction thereof;

Figure 3 is a view showing a vertical section through Figure 1;

Figure 4 is a view illustrating one form of control mechanism for operating the direction signals; and Figure 5 is a diagrammatic view showing the instrument and circuits therefor operatively mounted on an automotive vehicle.

Similar characters of reference designate similar parts in each of the several views.

The instrument illustrated in Figure 1 consists of a sheet-metal casing 1 provided with a cover 2 hinged at its lower edge as indicated at 3. The cover consists of a channelled frame 4 open at the upper edge as indicated at 5, so as to permit of the insertion into the frame of the conventional license plate 6 and a sheet of translucent glass 7, preferably white in color. The characters of the license plate are stenciled out, as indicated in Figure 1, so that the white plate of glass will appear in the outlines of the stencils, thus rendering the numbers very clearly visible. For night driving the interior of the casing is illuminated, as hereinafter explained, so that the characters of the plate are rendered even more plainly visible, as will be readily understood. The cover is held in its closed position by means of resilient clamping members 8 rigidly secured on the upper face of casing 1. By virtue of this feature the casing may readily be opened for inspection of the interior parts and for the replacement of lamp bulbs provided in the casing, as hereinafter described.

The upper face of the casing is provided with a compartment 9, the interior of which is open to the interior of the casing 1, a portion 10 of the upper wall of casing 1 having been removed, as clearly indicated in Figure 3. The face of compartment 9 is provided with a lens or bull's eye 11, preferably red in color. Behind this lens are mounted a pair of lamps 12 and 13, the latter being preferably of larger candle power than the former. Lamp 12 is constantly illuminated by a circuit, hereinafter described and serves thus to provide the ordinary tail-light of a vehicle. The light from this lamp, moreover, enters into the interior of the casing 1 through opening 10 and illuminates the plate 7, thus rendering the stenciled characters of the license plate clearly visible at night.

Lamp 13 is operated only at intervals, as hereinafter described, for the purpose of giving a stop or caution signal indication. The intensity of lamps 12 and 13 combined is far greater than that of lamp 12 alone, so that the lens or bull's eye 11 is illuminated far more brilliantly than before. This intensified illumination of lens 11 constitutes the stop or caution indication. The sudden change in brilliancy of lens 11 is very clearly noticeable and certain to catch the eye of the operator of a car in the rear, so that the chance that the signal will be overlooked is reduced to a minimum.

Mounted on the left and right ends of casing 1 are a pair of chambers 14 and 15, respectively, preferably substantially hemispherical in shape. These chambers are each provided with lenses 16 and 17, respectively, lamps 18 and 19 being mounted in the chambers behind the lenses. The last-mentioned chambers are separated from the interior of casing 1 by the left and right-hand walls 20 and 21, respectively, of casing 1, so that the light from the interior of the casing is shut off from the said chambers 14 and 15. The lamps 18 and 19 are controlled by the operator in a manner hereinafter described to indicate that the vehicle is about to make, or is making, a turn to the left or to the right, respectively. The colors of lenses 16 and 17 are preferably red, similarly to the tail light 11. A change of direction is therefore indicated by a pair of lights, a left turn being signalled by the appearance of a light to the left of the normally illuminated tail lamp, and a turn to the right being signalled by the appearance of a light to the right of the normally burning tail-light. These indications, it will again be observed, are unmistakable in character and clearly visible to the operators of vehicles.

To facilitate the replacement of bulbs 18 and 19 in chambers 14 and 15, the walls 20 and 21 are provided with openings normally covered by shutters 22 slidable in a guide frame 23. These shutters are merely lifted upwardly in the guides when a replacement or inspection of the compartments 14 and 15 is to be made.

In the interior of casing 1 is mounted a small oil lamp 24 which is intended to be used in case of emergency, as for example, when the normal tail light 12 fails to operate. This is a feature of great convenience to the operator in the operation of the vehicle in that it provides an ever present and convenient substitute for the normal tail light when the same is in inoperative condition. An opening 25 may be provided in the rear wall of casing 1 to permit of the lighting of lamp 24 without the removal of cover 2. A cover plate 26 pivoted at 27 is provided to hold opening 25 normally closed. Ventilating openings 50 are provided in the upper and lower walls of casing 1 to supply the necessary air for the operation of the lamp.

The control of lamps 18 and 19 for signalling a left turn and right turn, respectively, is effected by means of push switches 32 and 33, respectively, (Figure 4), affixed to arms 34 which are mounted on the steering post of the car by clamping mechanism 35. The switches are preferably mounted a short distance below the steering wheel 36 indicated in Figure 4 in dot-and-dash lines, the object being to permit the driver of the vehicle to operate the push buttons by the index or other convenient finger without taking his hands off the steering wheel.

When the operator of the vehicle is desirous of making a turn, say, to the left, he depresses push button 32 some time before he reaches the point at which he desires to make the turn, thus giving the drivers of other vehicles a warning in advance. Ordinarily the push button 32 will be actuated one or more times to cause an intermittent flashing of the turn signal to draw the attention of persons in the front or rear of the vehicle to the operator's intention to turn. As he reaches the point at which the turn is to be made, he rotates the steering wheel and in so doing causes a cam 37 mounted on the wheel to engage the push button and hold the same depressed while the turn is being made. The left turn signal is thus automatically held illuminated while the vehicle is turning, even though the operator removes his hand from the push button as he operates the steering wheel. Similarly, when a turn is being made to the right, the operator first depresses button 33 one or more times with his index finger to flash an advance warning and thereupon turns the wheel, causing the signal to be maintained illuminated while the vehicle is turning. When the vehicle again proceeds straight ahead, the signal automatically disappears.

The hereinabove described signal device is mounted on the vehicle at a convenient place in the rear, as indicated diagrammatically in Figure 5, and a similar instrument may be mounted on the front of the car to serve as an indicator for counter traffic or as a signal to the traffic police at crossings. The signal device mounted on the forward end of the car will be similar to the one hereinbefore mentioned, except that the lens 11 will preferably be colored green instead of red, and lamp 13 will be entirely omitted. The emergency lamp in this case serves to provide a green light in the front of the car in case of failure of the ordinary electric head light. Even if the entire electric lighting system of the car should fail, therefore, the emergency lamp will provide a head light and a tail light as well as an illuminated license plate, so that the vehicle may be operated in full compliance with the law.

The preferable form of circuit connections are diagrammatically indicated in Figure 5. The circuits of lamps 12 of the front and rear signals are governed by a switch 38 mounted in any convenient position, as for example, on the dash-board. The circuits of the left turn signal lamps 18 are governed by the switch 32 hereinbefore described, and the circuits for the right-turn signal lamps 19 are governed by switch 33. The circuit for stop light 13 is governed by the switch 28 operable by the service brake lever of the car, so that the stop indication is produced whenever a service application of the brake is made. The contacts of switch 28 are preferably set so far apart, however, that the signal indication will not appear upon a slight application of the brake, such as is made for effecting a small reduction in speed. The stop signal will, therefore, appear only when the brakes are applied with sufficient force to effect a considerable reduction in speed or an actual stop.

Although only a certain form of embodiment of the invention is shown and described herein, it will be readily understood that many changes and modifications may be made therein within the scope of the following claims without departing from the spirit and scope of the invention.

What I claim is:

1. In a device for governing the turn signal of a vehicle, a self-opening switch for controlling the signal mounted below the steering wheel in position to be manually operated prior to the turn without removing the hands from the steering wheel, and a cam mounted on the steering wheel and turning therewith to automatically close the said switch and hold the same closed while the vehicle is making a turn.

2. In a vehicle signalling system, a turn signal, means for operating said signal, said means comprising self-opening switch mechanism whereby the said signal may be intermittently flashed to effect a preliminary indication of the operator's intention to turn, and means operable automatically during the turning movement of the vehicle for holding the said switch mechanism closed to effect a continuous warning indication.

3. In a vehicle signalling system, left and right turn signals, manually and automatically operable means for operating said signals, said means comprising a pair of self-opening switches mounted in a position contiguous to the rim of the steering wheel of the vehicle so as to enable the operator to operate either of said switches without releasing his hold on the steering wheel, and means on the steering mechanism for automatically holding the said switch closed while the vehicle is making a turn.

4. In a vehicle signalling system a turn signal and means for automatically operating said signal by the steering mechanism and for manually operating said signal intermittently, said means including a self-opening switch and means for mounting said switch at a point contiguous to and slightly below the rim of the steering wheel, the operating member of said switch extending outwardly in a radial direction whereby the operator of said vehicle is able to intermittently flash the signal without removing his hand from the steering wheel, and means operable by the steering mechanism of the vehicle for holding said switch closed during the turning movement of the vehicle.

5. In a vehicle signalling system, left and right turn signals, manually and automatically operable means for operating said signals, said means comprising a pair of self-opening switches mounted in a position contiguous to the rim of the steering wheel of the vehicle so as to enable the operator to operate either of said switches without releasing his hold on the steering wheel, and a single cam on the steering mechanism of the vehicle for automatically holding the said switch closed while the vehicle is making a turn.

In testimony whereof I have affixed my signature to this specification.

ARAM SAMUEL OUZOONIAN